March 13, 1945.  E. T. TURNEY  2,371,559
LIGHT METER
Filed Aug. 6, 1943
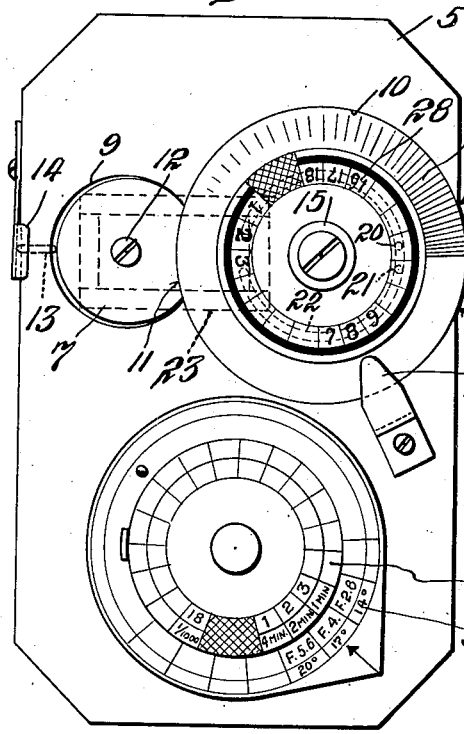
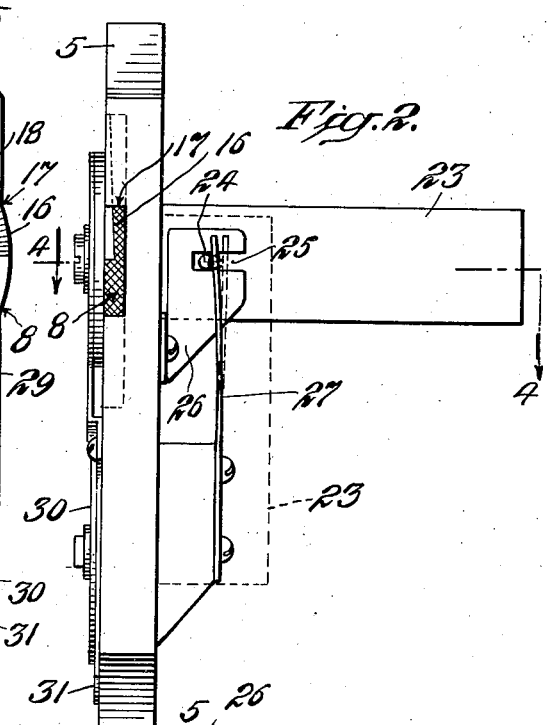
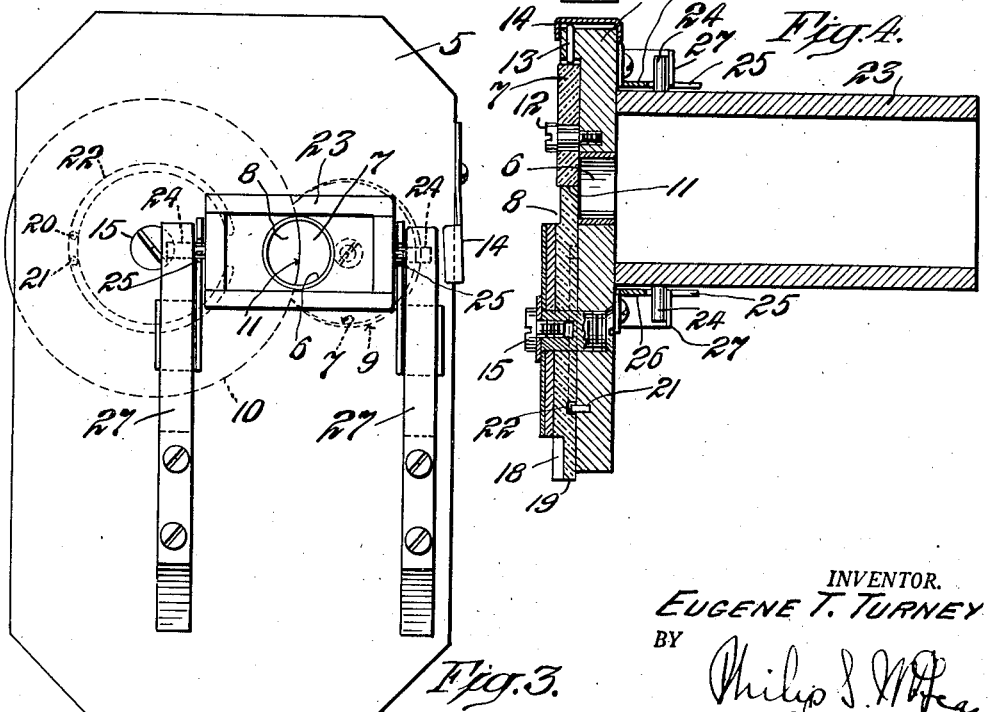
INVENTOR.
EUGENE T. TURNEY
BY
ATTORNEY Patented Mar. 13, 1945

2,371,559

UNITED STATES PATENT OFFICE 2,371,559

LIGHT METER

Eugene T. Turney, Holmes, N. Y.

Application August 6, 1943, Serial No. 497,703

7 Claims. (Cl. 88—23)

The invention here disclosed relates to light meters, for photographic or for any other light measuring purposes.

Objects of the invention are to provide an accurate reliable form of light meter, which will not require any electric light and the need for dry cells and the like.

Other important objects are to provide a simple, inexpensive form of device, small enough to be kept in a pocket or carried in the hand, which will have no parts to wear out and which will be ready for instant use always.

Other desirable objects and the novel features of the invention by which all objects are attained are hereinafter set forth or will appear in the course of the following specification.

The drawing accompanying and forming part of the specification illustrates a present practical embodiment of the invention. Structure however may be modified and changed all within the true intent and broad scope of the invention as hereinafter defined and claimed.

Fig. 1 in the drawing is a front elevation of the device.

Fig. 2 is a side view of the same.

Fig. 3 is a rear view.

Fig 4 is a horizontal sectional view on substantially the plane of line 4—4 of Fig. 2.

The base of the device is shown as consisting of a flat panel of opaque material 5, having a light opening 6, therethrough.

On the front of the panel there are mounted, in abutting edge-to-edge relation, over the light opening, a standard or constant density light transmitting member 7, and a variable density light transmitting element 8.

These two light measuring, comparing and calibrating members may be of plastic, glass or other suitable materials and they are shown in the general form of discs, one small and the other larger, set in circular seats 9, 10, in the face of the panel.

The smaller member 7, is shown arcuately notched at 11, to fit the periphery of the larger disc 8, and as held loosely centered on a stud screw 12, and yieldingly pressed against the edge of the larger disc by a pin 13, engaged by spring 14.

Disc 8, is shown rotatably centered on a stud screw 15, and as having its edge milled or knurled at 16, and exposed through a notch 17, in the edge of the panel.

The variable density effect is attained by making the rim portion of the comparing disc as a circular helical plane 18, with the back of the disc a flat plane as shown in Fig. 4. This provides a narrow rim portion 19, of continuously varying thickness to match the constant thickness of the standard light measuring member 7.

Stop pins 20, 21, are indicated in Figs. 3 and 4, engaging in a less than complete circular groove 22, in the back of the disc, to limit the extent of rotary adjustment and to assist the user in setting the device to an initial position, either for the maximum or the minimum light intensity.

To exclude side light and aid the user in quickly reaching accurate and fine adjustments, a viewing tube is shown at 23, pivoted on the back of the panel by means of pins 24, entered in slots 25, in brackets 26, said pins being engaged by springs 27, which hold the tube either abutted firmly against the panel, over the viewing opening or folded flat down over the back of the panel forming a protective cover for the opening. When folded down as in the dotted lines Fig. 2, the tube lies flat against the back panel, taking up but small space and closing the opening against the entrance of dust or other foreign matter.

To use the meter, it is only necessary to hinge the viewing tube up to the operative position shown in Fig. 2, and to look through this tube toward the field to be surveyed and adjust the variable density light disc one way or the other until that point is reached where the light appears to be of equal intensity in the two halves of the viewing opening.

The adjustable disc is shown as carrying a scale or graduations 28, registering with a pointer 29, providing a measure which can be taken off on a rotary scale 30, co-operatively related to a fixed scale 31, which may carry desired readings such as for certain photographic stops, times of exposure and the like.

The helical inclined plane forms a continuously variable wedge of light permeable material, instantly adjustable to any angular extent to match the light intensity of the fixed light transmitting member. The yielding edge-to-edge engagement of the two members prevents any perceptible light crevice between these members and enables the non-rotating member to yieldingly retain the rotatable member in any positions of adjustment. The spring 14 which through the pin 13, applies side pressure to the standard light transmitting member is shown placed at the edge of the panel, where additional pressure may be applied, through one of the fingers holding the device to more firmly hold or secure the parts in adjusted relation.

The device is particularly simple and inexpensive in construction and provides an accurate handy means for quickly determining light values and other related unknown factors.

The relatively adjustable members 7 and 8, may be of different colors, but up to the present time, red has been found to be the most satisfactory for general light value determining purposes.

What is claimed is:

1. A light meter, comprising a panel having a light passage therethrough, light transmitting elements mounted on said panel in edge-to-edge relation over said light passage, one of said elements having that portion of the same over said passage of continuously varying thickness and mounted for movement on the panel to bring portions of different thickness into coactive relation with said other element and the portion of said other element over said light passage being of substantially uniform thickness.

2. A light meter, comprising a panel having a light passage therethrough, light transmitting elements mounted on said panel in edge-to-edge engagement over said light passage, one of said elements having that portion of the same over said passage of continuously varying thickness, mounted for movement on the panel to bring portions of different thickness into coactive relation with said other element and means for tensioning said elements into frictional edge-to-edge holding engagement with each other.

3. A light meter, comprising a support having a light passage, disc members of light transmitting material mounted on said support, one in rotatable and the other in non-rotatable, edge-to-edge relation over said light passage, said non-rotatable element having its edge notched to fit the edge of the rotatable element and the latter having the rim portion of the same varying in thickness.

4. A light meter, comprising a support having a light passage, light transmitting elements mounted in edge-to-edge relation over said light passage, one of said elements being rotatable and the other non-rotatably mounted and the latter having a notched edge rotatably receiving the edge portion of the rotatable element, the rim portion of said rotatable element being in the form of a flat helix increasing in thickness from one end to the other.

5. A light meter, comprising a support having a light passage, light transmitting elements mounted in edge-to-edge relation over said light passage, one of said elements being rotatable and the other non-rotatably mounted and the latter having a notched edge rotatably receiving the edge portion of the rotatable element, the rim portion of said rotatable element being in the form of a flat helix increasing in thickness from one end to the other, the edge of said rotatable element projecting from the edge of the support for facilitating rotary adjustments of the same.

6. A light meter, comprising a panel having a light passage therethrough, light transmitting members mounted on the face of the panel in abutting edge-to-edge relationship over said light passage, one of said members being rotatably mounted on said panel and having a circularly extending portion of varying thickness and light transmissibility, said member having an exposed finger engageable portion for turning the same and means for limiting the extent of turning adjustment of said member.

7. A light meter, comprising a support having a light passage, light transmitting members mounted in edge-to-edge relation on said support over said light passage, one of said members having sections varying in light transmissibility and rotatably mounted to bring different sections over the light passage, the other member being notched to fit the edge of the rotatable member and means for yieldingly pressing said notched member against the edge of the rotatable member to yieldingly hold the latter in adjusted relation.

EUGENE T. TURNEY.